(12) United States Patent
Li

(10) Patent No.: US 12,552,325 B2
(45) Date of Patent: Feb. 17, 2026

(54) VEHICLE TRUNK LUGGAGE RACK

(71) Applicant: Peidong Li, Dazhou (CN)

(72) Inventor: Peidong Li, Dazhou (CN)

( * ) Notice: Subject to any disclaimer, the term of this patent is extended or adjusted under 35 U.S.C. 154(b) by 44 days.

(21) Appl. No.: 18/675,508

(22) Filed: May 28, 2024

(65) Prior Publication Data

US 2025/0368144 A1   Dec. 4, 2025

(51) Int. Cl.
*B60R 9/06* (2006.01)

(52) U.S. Cl.
CPC ..................... *B60R 9/06* (2013.01)

(58) Field of Classification Search
CPC ...... B60R 9/06; B60R 9/08; B60R 2011/0003
See application file for complete search history.

(56) References Cited

U.S. PATENT DOCUMENTS

| | | | | |
|---|---|---|---|---|
| 5,669,537 A * | 9/1997 | Saleem | ...................... | B60R 7/02 224/42.32 |
| 5,931,527 A * | 8/1999 | D'Onofrio | .............. | B60N 3/004 297/188.05 |
| 5,967,054 A * | 10/1999 | Rosenfeld | .............. | B60N 3/002 5/118 |
| 6,082,838 A * | 7/2000 | Bissu-Palombo | ........................... | A47B 21/0314 108/50.01 |
| 6,502,900 B1 * | 1/2003 | Johnston | ................. | B60N 2/879 297/188.05 |
| 6,516,983 B2 * | 2/2003 | Sotiroff | .................... | B60R 21/12 224/403 |
| 7,350,681 B2 * | 4/2008 | Polburn | .................. | B60R 7/005 296/37.16 |
| 10,421,406 B2 * | 9/2019 | Bergdahl | ................... | B60R 7/02 |
| 11,613,198 B1 * | 3/2023 | Carlseen | ................... | B60P 3/39 296/165 |
| 11,833,955 B1 * | 12/2023 | Sullivan | ............... | B60N 2/3095 |
| 11,858,466 B2 * | 1/2024 | Gandolfo | ............... | B60R 7/043 |
| 12,179,702 B2 * | 12/2024 | Ninamohina | ........... | B60R 5/045 |
| 12,304,367 B1 * | 5/2025 | Sullivan | .................. | A47C 17/80 |
| 2020/0172016 A1 * | 6/2020 | Sanders | ................... | B60R 5/047 |
| 2025/0145091 A1 * | 5/2025 | Hall | ........................ | B60R 11/06 |
| 2025/0249837 A1 * | 8/2025 | Littrell | ....................... | B60R 9/06 |

FOREIGN PATENT DOCUMENTS

CN   217415617 U   9/2022

* cited by examiner

*Primary Examiner* — Brian D Nash
(74) *Attorney, Agent, or Firm* — Nicholas Makridakis

(57) ABSTRACT

The present invention discloses a vehicle trunk luggage rack, aiming to flexibly fold the storage board and quickly detach it to serve as a table. Simultaneously, it provides a vehicle with the following technical solution: a vehicle trunk luggage rack comprising a storage board and two side frames arranged at intervals. The side frames are equipped with support plates. The support plates comprise sequentially connected horizontal sections and inclined sections. The inclined sections slope downward away from the horizontal sections. The horizontal sections on the two side frames cooperate to support the storage board when placed horizontally, while the inclined sections on the two side frames cooperate to support the storage board when placed at an angle. This belongs to the technical field of vehicle auxiliary devices.

8 Claims, 10 Drawing Sheets

VEHICLE TRUNK LUGGAGE RACK

TECHNICAL FIELD

The present invention pertains to the technical field of vehicle auxiliary devices. More specifically, it relates to a trunk luggage rack for vehicles.

BACKGROUND

Off-road vehicles often need to carry a large amount of camping equipment for convenience during outdoor activities such as picnics.

Therefore, some vehicles add a luggage rack in the trunk to ensure full utilization of the trunk space. For example, patent CN217415617U discloses a car storage rack support structure and a retractable car storage rack. It includes a hanging rack assembly that fits with the side walls of the car trunk. The hanging rack assembly consists of symmetrically arranged left and right hanging racks. A pair of symmetrical slides are set on the left and right hanging racks. The slides are arc-shaped and slope downward in the direction away from the rear of the car.

The above-mentioned vehicle storage rack uses the slide rails to guide the storage board, allowing the storage board to tilt and fold. However, in this structure, the slide rails are arc-shaped, and to enable the storage board to slide, bearings are required. The bearings fit within the slide rails, allowing the storage board to slide along the slide rails. But these bearings also limit the storage board to being either flat or tilted, making it difficult to quickly detach. In practice, when camping, a table is often needed. If the storage board could be quickly detached to serve as a table, there would be no need to carry an additional table, reducing the burden of carrying camping equipment.

Therefore, the technical problem to be solved by this application is: How to propose a luggage rack that is both easy to fold and can be quickly detached.

SUMMARY

The primary objective of this present invention is to provide a vehicle trunk luggage rack that can flexibly fold the storage board and can also quickly detach the storage board to serve as a table.

According to the first aspect of this present invention, a vehicle trunk luggage rack is provided, comprising a storage board and two side frames arranged at intervals. The side frames are equipped with support plates. The support plates comprise sequentially connected horizontal sections and inclined sections, with the inclined sections sloping downward away from the horizontal sections. The horizontal sections on the two side frames cooperate to support the storage board when placed horizontally, and the inclined sections on the two side frames cooperate to support the storage board when placed at an angle.

The luggage rack further includes a limiting frame located above the inclined sections. When the storage board is placed horizontally on the horizontal sections, one end of the storage board can snugly fit against the limiting frame in the horizontal direction.

The limiting frame leaves a gap between itself and the horizontal section, allowing the storage board to pass through the gap. In the aforementioned vehicle trunk luggage rack, the limiting frame connects the two side frames. Both the horizontal and inclined sections of the luggage rack are equipped with wheels. On one of the side frames of the luggage rack, a support plate is provided, and a baffle is positioned on one side of the support plate away from another support plate; the spacing between the two baffles matches the length of the storage board. The limiting frame on the luggage rack has a first recess on the side closer to the storage board, into which the storage board can be inserted. At least one side frame of the luggage rack has a fixing piece located at one end of the horizontal section away from the limiting frame, which prevents the storage board from sliding off the horizontal section. The luggage rack further includes a protective plate connecting the two side frames. The protective plate is positioned at one end of the inclined section away from the horizontal section and has a second recess; when the storage board is placed at an angle, the lower end of the storage board can be inserted into the second recess. Above at least one inclined section of the luggage rack, a support block is provided and movably connected to the side frame. When the support block is in a first position, the storage board can contact the wheels on the inclined section; when the support block is in a second position, it lifts the storage board to conform to the back of the rear seat. The side frames of the luggage rack have storage compartments and hanging plates for hanging items, with multiple through-holes on the hanging plates. The storage board is equipped with holes for installing table legs. According to the second aspect of this present invention, a vehicle is provided, which is equipped internally with the vehicle trunk luggage rack as described in the first aspect.

At least one of the technical solutions in the aforementioned present invention has the following advantages or beneficial effects:

In this present invention, the storage board is placed on the side frames. When used for storage, the storage board is placed horizontally on the horizontal section, and the limiting frame is used to keep the storage board level and prevent it from falling onto the inclined section. To fold the storage board, it needs to be lifted from one end away from the limiting frame, allowing it to slide from the gap to the inclined section, conforming to the back of the rear seats. Because the storage board does not need bearings to connect to the inclined and horizontal sections, it can be lifted directly from the horizontal section to serve as a table, which is quick and convenient.

BRIEF DESCRIPTION OF DRAWINGS

The following further describes the present invention in conjunction with the drawings and embodiments.

1. Storage board; 11. Hole; 2. Side frame; 21. Support plate; 211. Horizontal section; 212. Inclined section; 22. Wheel; 23. Baffle; 24. Support block; 25. Storage compartment; 26. Hanging plate; 3. Limiting frame; 31. First recess; 32. Elastic member; 4. Protective plate; 41. Second recess; 5. Fixing piece.

DESCRIPTION OF EMBODIMENTS

The following detailed description of the embodiments illustrates examples of the present invention, with the same or similar reference numbers representing the same or similar elements or elements with similar functions throughout. The described embodiments are exemplary and illustrative, serving to explain the present invention rather than limiting it.

Various embodiments or examples are disclosed herein to implement different aspects of the present invention.

Figure 1:
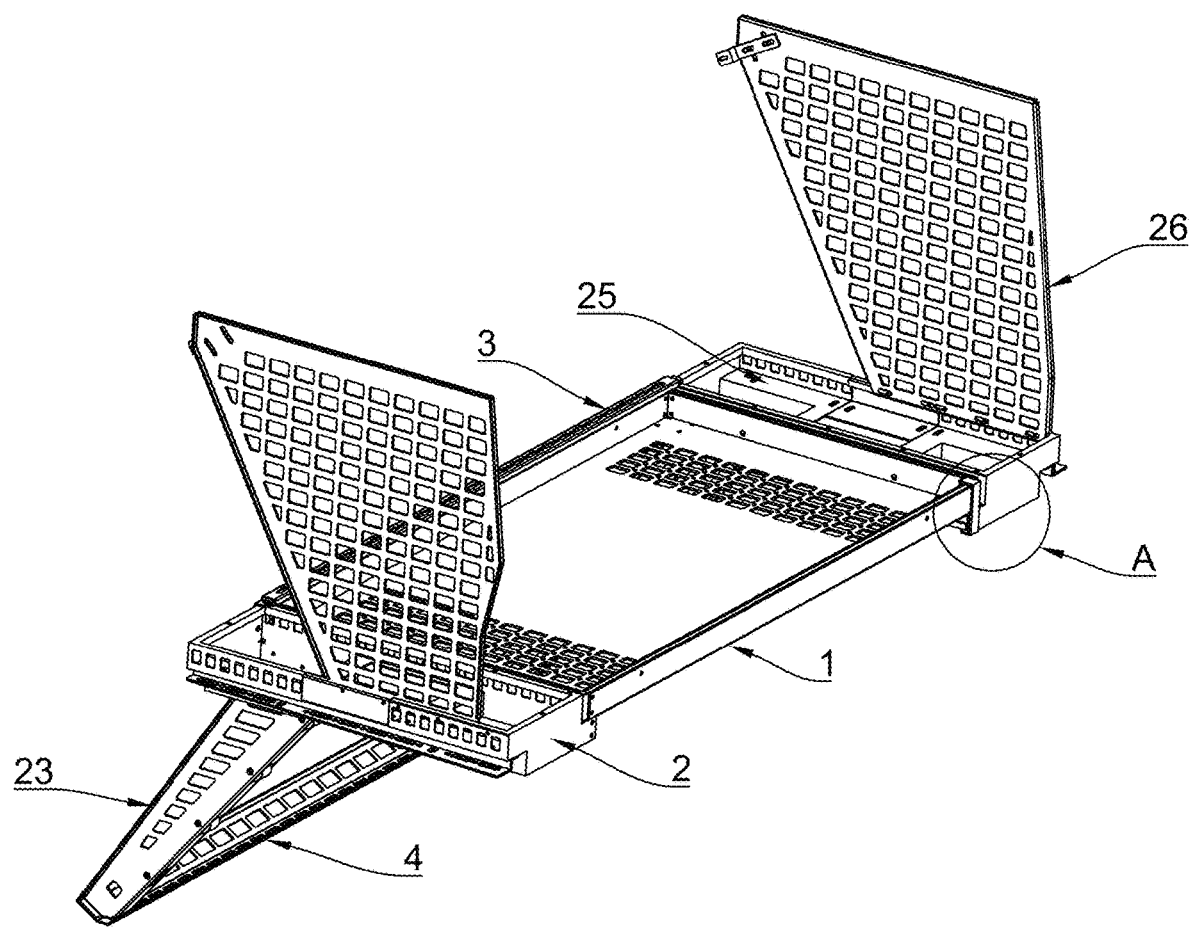
FIG. 1 is a schematic diagram of the structure of the present invention's first embodiment with the storage board placed horizontally.
Figure 2:
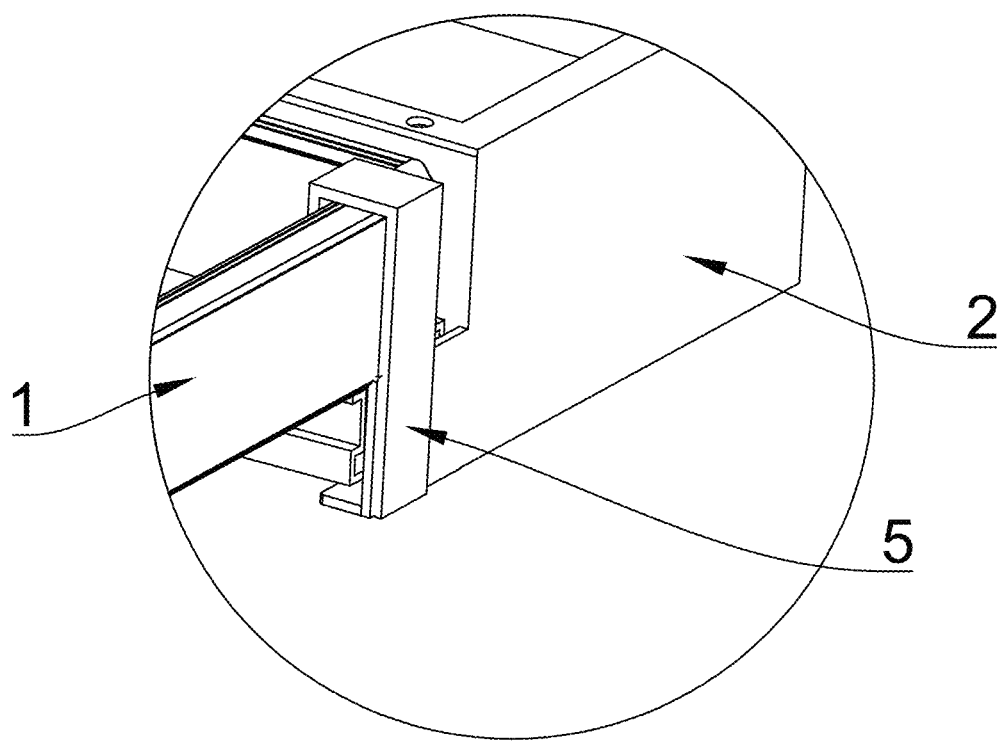
FIG. 2 is an enlarged view of part A of FIG. 1 from the first embodiment of the present invention.
Figure 3:
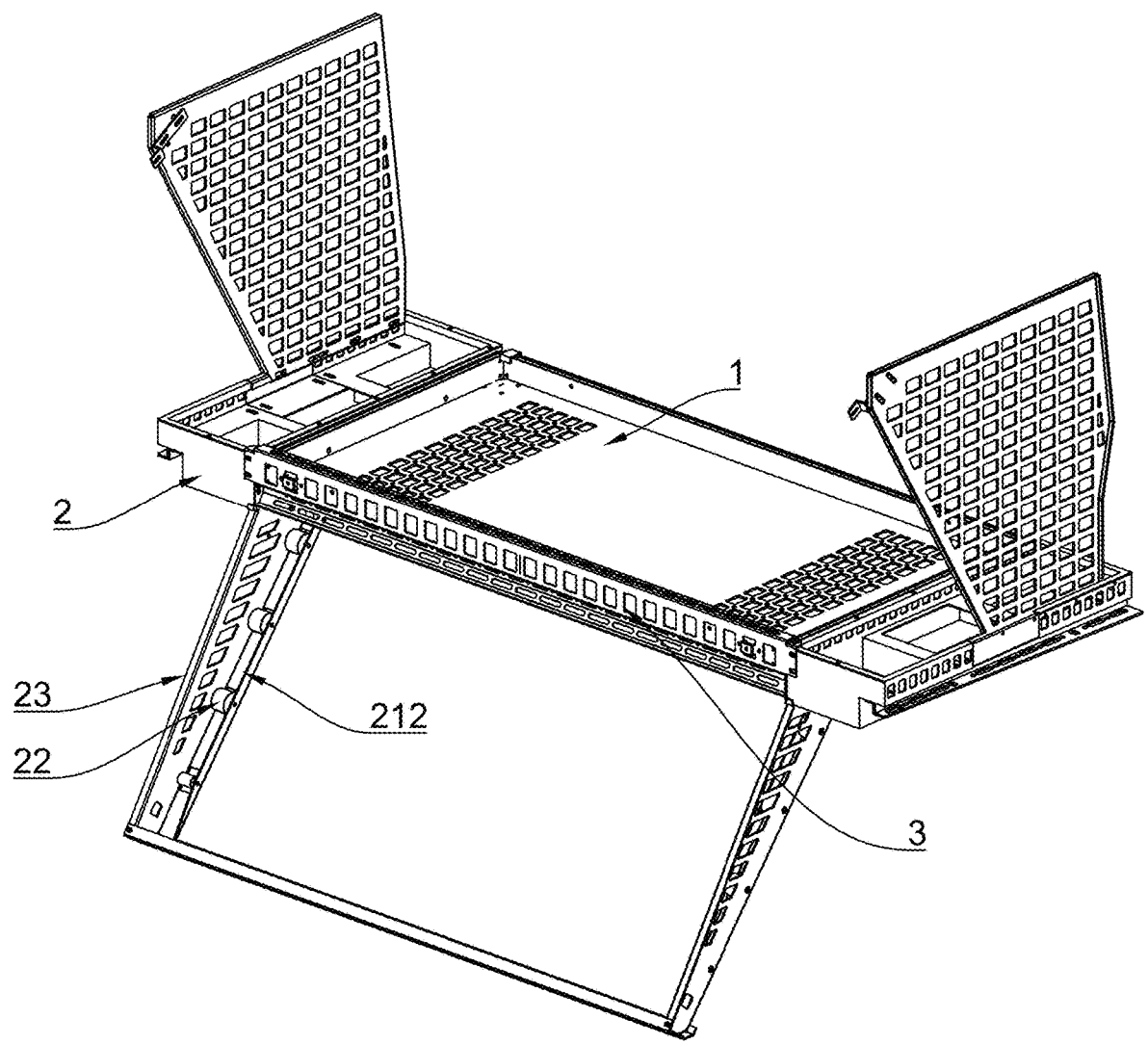
FIG. 3 is another schematic diagram of the structure with the storage board placed horizontally in the first embodiment of the present invention.
Figure 4:
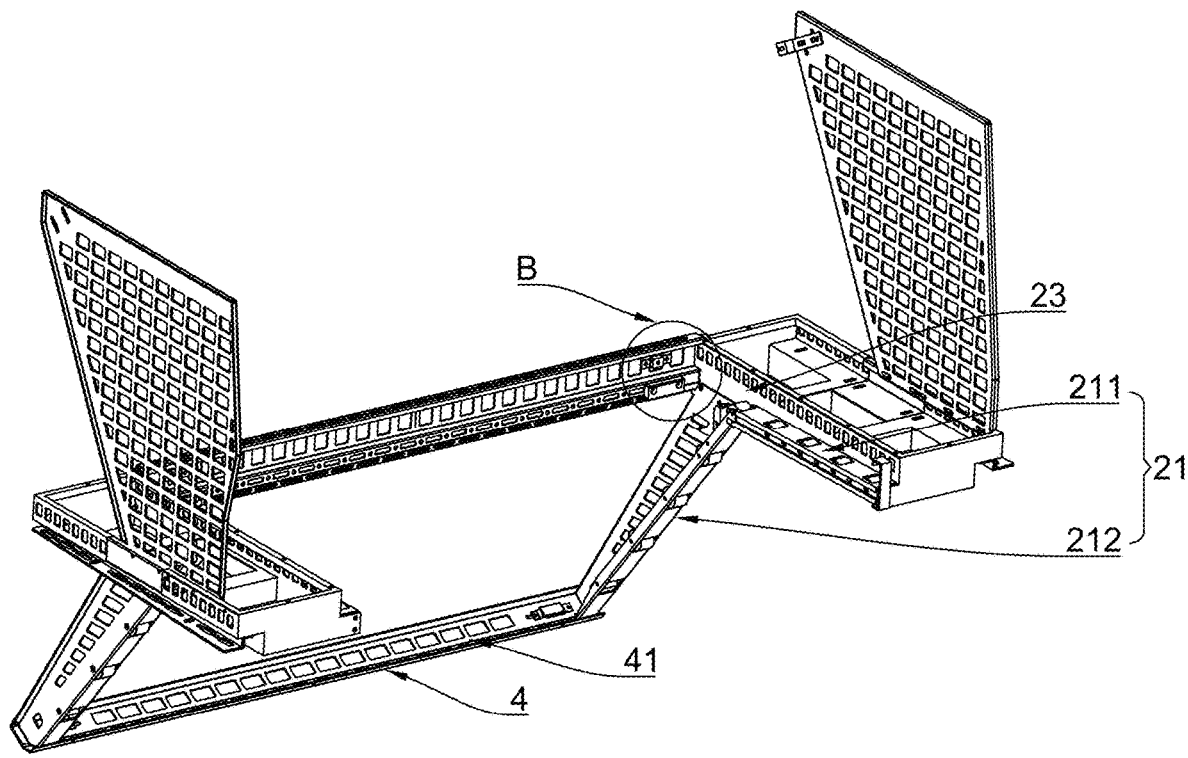
FIG. 4 is a schematic diagram of the structure after removing the storage board in the first embodiment of the present invention.
Figure 5:
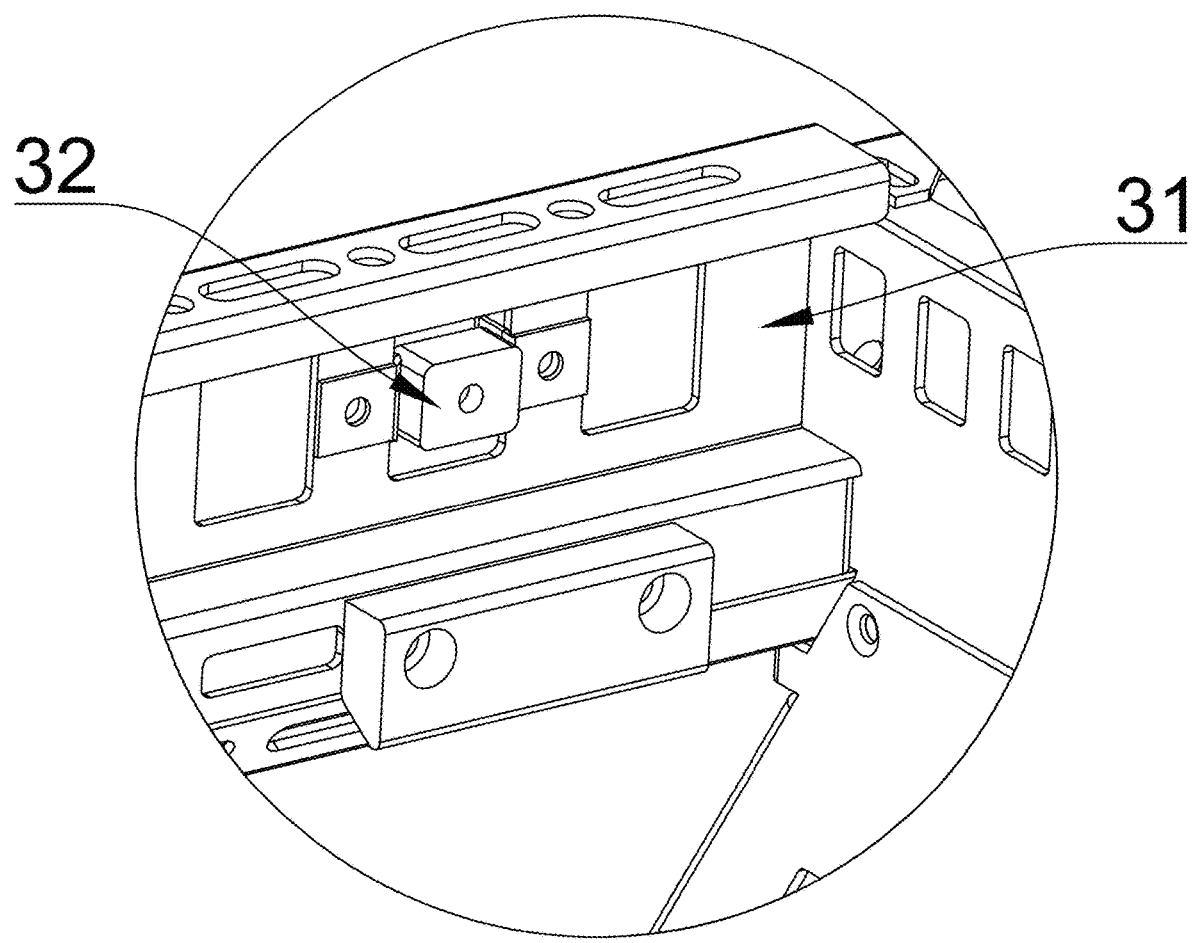
FIG. 5 is an enlarged view of part B of FIG. 4 from the first embodiment of the present invention.
Figure 6:
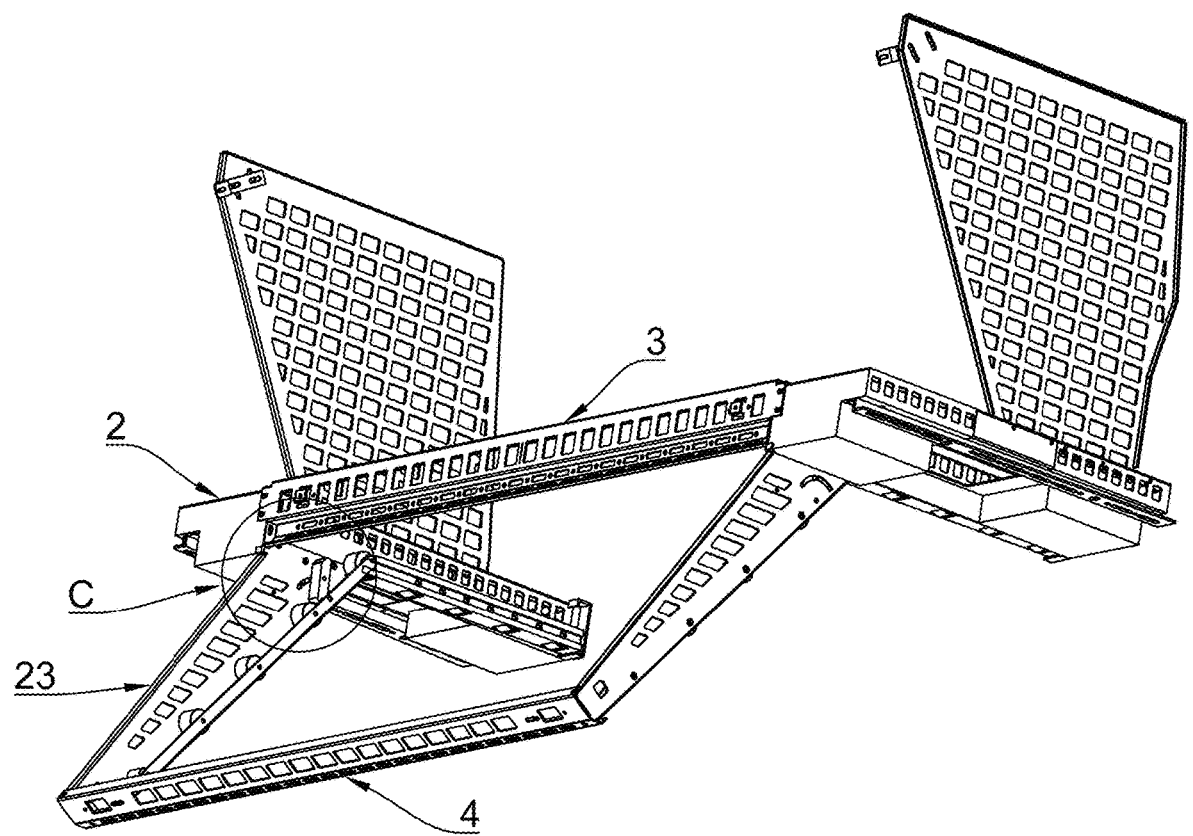
FIG. 6 is another schematic diagram of the structure after removing the storage board in the first embodiment of the present invention.
Figure 7:
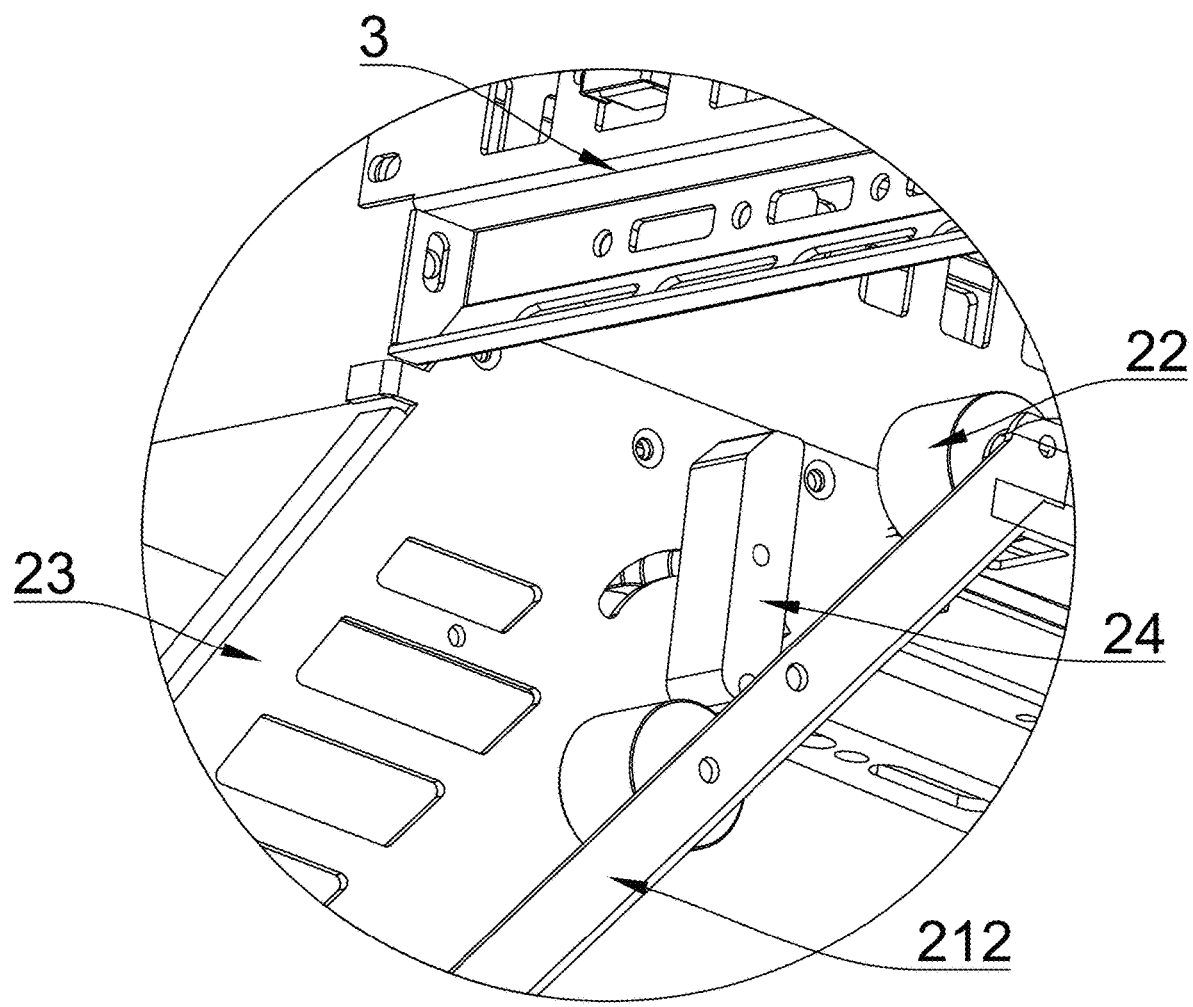
FIG. 7 is an enlarged view of part C of FIG. 6 from the first embodiment of the present invention.
Figure 8:
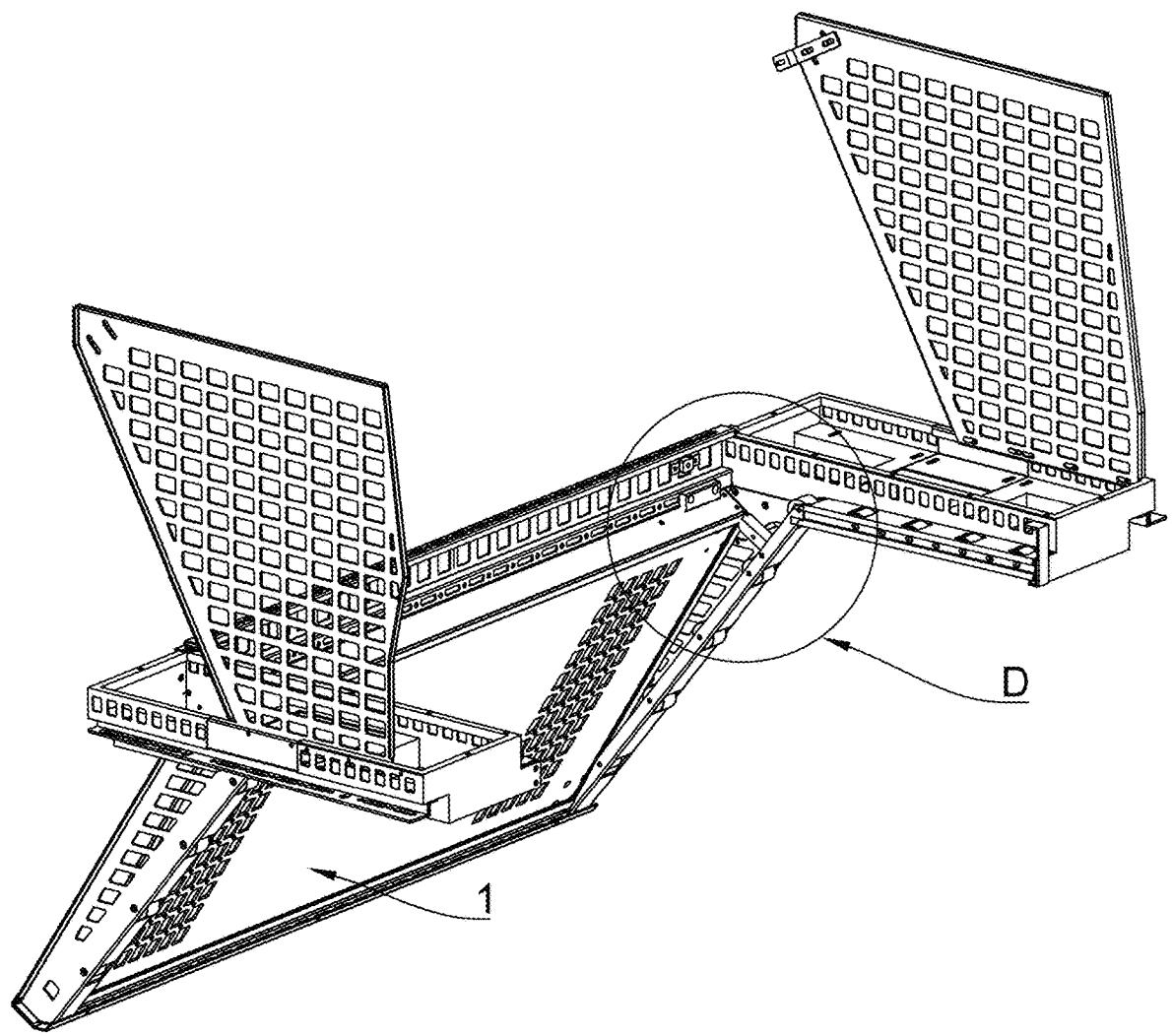
FIG. 8 is a schematic diagram of the structure with the storage board placed at an angle in the first embodiment of the present invention.
Figure 9:
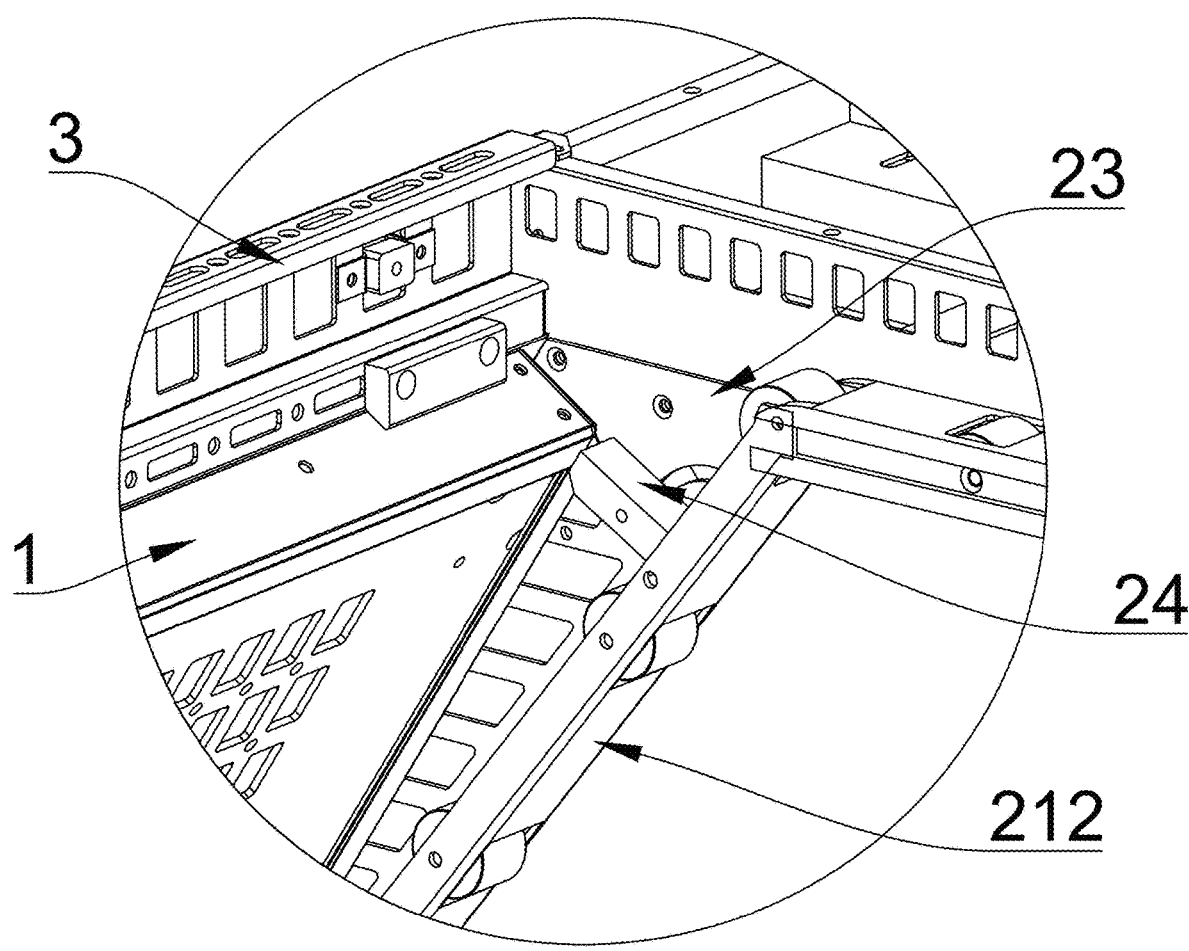
FIG. 9 is an enlarged view of part D of FIG. 8 from the first embodiment of the present invention.
Figure 10:
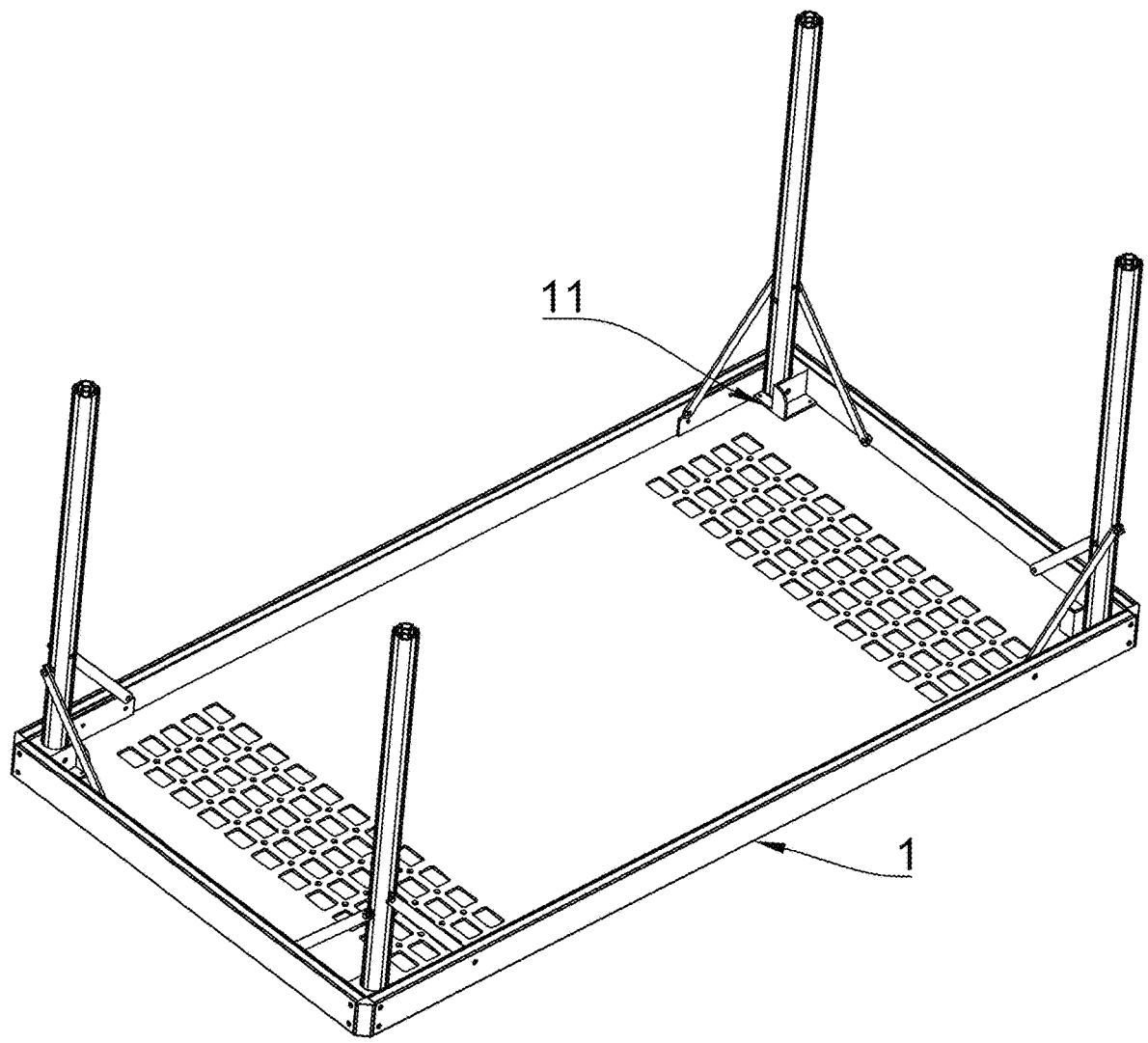
FIG. 10 is a schematic diagram of the structure with the storage board serving as a table in the first embodiment of the present invention.

Referring to FIGS. 1 to 10, in one embodiment of the present invention, a vehicle trunk luggage rack includes a storage board 1 and two side frames 2 arranged at intervals. The side frames 2 have support plates 21, which include sequentially aligned horizontal sections 211 and inclined sections 212. The inclined sections 212 slope downward away from the horizontal sections 211. The horizontal sections 211 on the two side frames 2 can support the storage board 1 when placed horizontally, while the inclined sections 212 on the two side frames 2 can support the storage board 1 when placed at an angle.

The luggage rack further includes a limiting frame 3 connecting the two side frames 2, positioned above the inclined sections 212. When the storage board 1 is placed horizontally on the horizontal sections 211, one end of the storage board 1 can abut against the limiting frame 3. A gap is left between the limiting frame 3 and the horizontal sections 211, allowing the storage board 1 to pass through.

When used for storage, the storage board 1 is placed horizontally on the horizontal sections 211 and is restrained by the limiting frame 3 to prevent it from falling onto the inclined sections 212. To retract the storage board 1, it needs to be lifted away from one end of the limiting frame 3, allowing it to slide into the inclined sections 212, fitting against the back of the rear seats. The storage board 1 can be lifted directly from the horizontal sections 211 to be used as a table, without the need for bearings to connect it to the inclined sections 212 or horizontal sections 211.

In this embodiment, the limiting frame 3 has a first recess 31 on the side near the storage board 1, into which the storage board 1 can be inserted. This design ensures that the limiting frame 3 and horizontal sections 211 together support the storage board 1, preventing it from tipping up. However, to retract the storage board 1, it needs to be pulled out first before being lifted to slide onto the inclined sections 212.

Both the horizontal sections 211 and the inclined sections 212 are equipped with wheels 22 to facilitate movement of the heavy storage board 1. Note that multiple wheels 22 are provided on both the horizontal sections 211 and the inclined sections 212.

A protective plate 4 is also provided, connecting the two side frames 2 and located at one end of the inclined sections 212 away from the horizontal sections 211. The protective plate 4 has a second recess 41, into which the lower end of the storage board 1 can be inserted when it is inclined, preventing direct contact with the vehicle interior to avoid damage.

In this embodiment, at least one support block 24 is provided above one of the inclined sections 212, connected pivotally to the side frames 2 via a baffle 23. The support block 24 can rotate and is positioned between two wheels 22. When rotated to a first position, the support block 24 hides between the two wheels 22, allowing easy movement of the storage board 1 on the inclined sections 212. When rotated to a second position, the support block 24 emerges between the two wheels 22, lifting the storage board 1 to fit against the back of the seats, saving trunk space when retracted. Specifically, both inclined sections 212 have support blocks 24. The support block 24 is connected to the baffle 23 and can rotate. A threaded handle is provided through an arc-shaped groove on the baffle 23 and is threadedly engaged with a threaded hole on the support block 24. When tightened, the support block 24 is fixed and cannot rotate. When loosened, the support block 24 can be rotated to adjust its angle.

Elastic members 32 can be provided on both the limiting frame 3 and the protective plate 4 to cushion impacts on the storage board 1. During vehicle travel, these elastic members 32 absorb most of the shocks, reducing noise caused by the storage board 1. The elastic members 32 can be springs, elastic pads, etc., and are generally located in the first recess 31 and the second recess 41.

In this embodiment, one side frame 2 has a support plate 21, and a baffle 23 is provided on the side away from the other support plate 21 to prevent lateral movement of the storage board 1. Ideally, the spacing between the two baffles 23 matches the length of the storage board 1 to constrain it whether horizontal or inclined.

In this embodiment, at least one side frame 2 has a fixing piece 5 located at one end of the horizontal section 211 away from the limiting frame 3. When the storage board 1 is placed on the horizontal sections 211, the fixing piece 5 prevents the storage board 1 from sliding out from the end away from the limiting frame 3. When combined with the limiting frame 3, it holds the storage board 1 securely.

Specifically, the fixing piece 5 can be detachably fixed to the side frame 2 with a bolt or a clip.

In this embodiment, the side frame 2 has a storage groove 25 for storing small items, and a hanging board 26 with multiple through-holes for hanging items such as fire extinguishers or storage bags.

The storage board 1 has holes 11 for installing table legs. When the storage board 1 is removed, table legs can be directly installed at the holes 11 to transform the storage board 1 into a table.

In other embodiments, foldable table legs are integrated into the storage board 1, which can be unfolded to form a table without additional assembly.

Based on the same inventive concept of the above embodiments, a vehicle is also provided with the described vehicle trunk luggage rack in its trunk. The side frames 2 are fixedly connected to the vehicle body, and the inclined sections 212 are located at the end of the horizontal sections 211 facing away from the trunk door.

Although embodiments of the present invention have been disclosed and described, those skilled in the art will understand that various changes, modifications, substitutions, and variations can be made to these embodiments without departing from the principles and spirit of the present invention, as defined by the claims and their equivalents.

What is claimed is:

1. A vehicle trunk luggage rack, comprising a storage board and two side frames arranged at intervals;
   wherein the side frames are equipped with support plates, the support plates comprise sequentially connected horizontal sections and inclined sections, with the inclined sections sloping downward away from the horizontal sections;
   the horizontal sections of the side frames are configured to cooperate with each other to support the storage board when being placed horizontally, and the inclined sections of the side frames are configured to cooperate with each other to support the storage board when being placed at an angle; and
   the vehicle trunk luggage rack further comprises a limiting frame located above the inclined sections; when the storage board is placed horizontally on the horizontal sections, one end of the storage board is abutted against the limiting frame in a horizontal direction; a gap is left between the limiting frame and the horizontal sections, and the storage board is configured to pass through the gap; and
   wherein the limiting frame is configured to connect the two side frames.

2. The vehicle trunk luggage rack according to claim 1, wherein both the horizontal sections and the inclined sections are equipped with wheels.

3. The vehicle trunk luggage rack according to claim 2, wherein the vehicle trunk luggage rack further comprises a protective plate connecting the two side frames, and the protective plate is located at one end of the inclined sections away from the horizontal sections; and wherein a second recess is provided on the protective plate, and a lower end of the storage board is inserted into the second recess when being placed at the angle.

4. The vehicle trunk luggage rack according to claim 3, wherein at least one support block is provided above at least one inclined section and is movably connected to the side frames;
   when the support block is in a first position, the storage board is configured to contact the wheels disposed on the inclined sections; and when the support block is in a second position, the support block is configured to lift the storage board to fit a back of a seat.

5. The vehicle trunk luggage rack according to claim 1, wherein one of the side frames is equipped with one support plate, and a baffle is provided on one side of the support plate away from another support plate; and a spacing between two baffles is configured to match a length of the storage board.

6. The vehicle trunk luggage rack according to claim 1, wherein the limiting frame is equipped with a first recess on a side thereon closer to the storage board, and the storage board is inserted into the first recess.

7. The vehicle trunk luggage rack according to claim 1, wherein at least one side frame is equipped with a fixing piece, and the fixing piece is located at one end of the horizontal sections away from the limiting frame to prevent the storage board from sliding out of the horizontal sections.

8. The vehicle trunk luggage rack according to claim 1, wherein the storage board is equipped with holes for installing table legs.

* * * * *